US011325579B2

(12) United States Patent
Nose et al.

(10) Patent No.: US 11,325,579 B2
(45) Date of Patent: May 10, 2022

(54) CONTROLLER AND CONTROL METHOD FOR HYBRID VEHICLE

(71) Applicant: TOYOTA JIDOSHA KABUSHIKI KAISHA, Toyota (JP)

(72) Inventors: Yuki Nose, Kasugai (JP); Yuto Ikeda, Toyota (JP); Hirofumi Hashinokuchi, Toyota (JP); Tatsuaki Suzuki, Okazaki (JP); Eiji Ikuta, Oobu (JP); Keiichi Myojo, Okazaki (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 16/527,237

(22) Filed: Jul. 31, 2019

(65) Prior Publication Data
US 2020/0047741 A1 Feb. 13, 2020

(30) Foreign Application Priority Data

Aug. 7, 2018 (JP) ............................. JP2018-148064

(51) Int. Cl.
*B60K 6/24* (2007.10)
*F02D 41/02* (2006.01)
*F01N 3/021* (2006.01)
*B60W 20/00* (2016.01)
*B60K 6/28* (2007.10)
*B60K 6/26* (2007.10)
(Continued)

(52) U.S. Cl.
CPC ............. *B60W 20/00* (2013.01); *B60K 6/24* (2013.01); *B60K 6/26* (2013.01); *B60K 6/28* (2013.01); *F01N 3/021* (2013.01); *F01N 3/101* (2013.01); *F01N 3/2033* (2013.01); *F02D 41/025* (2013.01); *F02D 41/042* (2013.01); *B60W 2510/244* (2013.01); *B60Y 2200/92* (2013.01)

(58) Field of Classification Search
CPC ... B60W 20/00; B60W 2510/244; B60K 6/24; B60K 6/26; B60K 6/28; F01N 3/021; F01N 3/101; F01N 3/2033; F02D 41/025; F02D 41/042
USPC ........................................................ 701/22
See application file for complete search history.

(56) References Cited

U.S. PATENT DOCUMENTS

| 2011/0072800 A1* | 3/2011 | Bidner ................ F02M 26/47 60/286 |
| 2013/0091828 A1 | 4/2013 | In et al. |

(Continued)

FOREIGN PATENT DOCUMENTS

| JP | 2003-328864 A | 11/2003 |
| JP | 2013-087770 A | 5/2013 |

(Continued)

*Primary Examiner* — Mahmoud Gimie
(74) *Attorney, Agent, or Firm* — Oliff PLC (57) ABSTRACT

A controller configured to control a hybrid vehicle includes a catalyst temperature increase control unit configured to execute a catalyst temperature increase control of increasing a temperature of a three-way catalyst device, a motoring control of rotating a crankshaft of an internal combustion engine with power of a motor in a state in which combustion of the internal combustion engine is stopped, and a fuel introduction process of introducing unburned air-fuel mixture into an exhaust passage by performing fuel injection in the internal combustion engine during the execution of the motoring control.

7 Claims, 4 Drawing Sheets

(51) Int. Cl.
  *F01N 3/10* (2006.01)
  *F01N 3/20* (2006.01)
  *F02D 41/04* (2006.01)

(56) References Cited

U.S. PATENT DOCUMENTS

2014/0041362 A1* 2/2014 Ulrey ................ F02D 41/0087
    60/274
2017/0096136 A1* 4/2017 Nawata ................ B60W 10/06
2020/0031333 A1* 1/2020 Onuma ..................... F01N 9/00

FOREIGN PATENT DOCUMENTS

| JP | 2015140150 A | * | 8/2015 | ............ B60W 20/16 |
| JP | 2015-202832 A | | 11/2015 | |
| WO | 2015/159218 A2 | | 10/2015 | |

* cited by examiner

CONTROLLER AND CONTROL METHOD FOR HYBRID VEHICLE

FIELD

The following description relates to a controller and a control method for a hybrid vehicle including a spark-ignition internal combustion engine in which a three-way catalyst device is arranged in an exhaust passage.

DESCRIPTION OF RELATED ART

A spark-ignition internal combustion engine performs combustion by igniting, with a spark of an ignition plug, the mixture of air and fuel introduced into a cylinder. The combustion of some of the fuel in the air-fuel mixture may be incomplete, thereby generating carbonaceous particulate matter (hereinafter referred to as particulates).

U.S. Patent Application Publication No. 2014/0041362 discloses an onboard spark-ignition internal combustion engine including a three-way catalyst device arranged in an exhaust passage and a particulate-capturing filter arranged at the downstream side of the three-way catalyst device in the exhaust passage. In such an internal combustion engine, particulates generated in the cylinder are captured by the filter to restrict the particulates from being released to the outside. The captured particulates gradually deposit in the filter. Thus, if the deposit is left, the deposited particulates may eventually clog the filter.

In the internal combustion engine, the particulates deposited in the filter are removed in the following manner. That is, in the internal combustion engine, while the vehicle is coasting, fuel injection is performed with the spark of the ignition plug stopped, thereby introducing unburned air-fuel mixture into the three-way catalyst device. When the unburned air-fuel mixture is introduced, the air-fuel mixture burns in the three-way catalyst device, thereby increasing the temperature of the three-way catalyst device (hereinafter referred to as catalyst temperature). Such an increase in the catalyst temperature increases the temperature of gas flowing out of the three-way catalyst device and into the filter. When the heat of the high-temperature gas increases the temperature of the filter to become greater than or equal to the ignition point of the particulates, the particulates deposited in the filter are burned and removed.

In order to introduce unburned air-fuel mixture into the exhaust passage, the crankshaft needs to be rotated to deliver the air-fuel mixture in the cylinder into the exhaust passage. The combustion operation of the internal combustion engine needs to be stopped to introduce unburned air-fuel mixture into the exhaust passage. Thus, the crankshaft needs to be rotated by external power. Accordingly, in the internal combustion engine, a catalyst temperature increase control is executed while the vehicle is coasting and the crankshaft is being rotated through transmission of power from wheels. However, in such a case, the opportunity to execute the catalyst temperature increase control is limited. Thus, the catalyst temperature increase control may not be executed at necessary timings.

The catalyst temperature increase control may be executed for purposes other than burning and removal of the particulates deposited in the filter. For example, in a case in which the exhaust purification performance is reduced due to a decrease in the catalyst temperature, the catalyst temperature increase control may be executed to restore the exhaust purification performance of the three-way catalyst device. In such a case, the above-described problem can occur in the same manner. Thus, regardless of objectives, the above-described problem is common when the catalyst temperature increase control is performed by introducing unburned air-fuel mixture into the three-way catalyst device.

SUMMARY

A first aspect provides a controller configured to control a hybrid vehicle. The hybrid vehicle includes a spark-ignition internal combustion engine having a three-way catalyst device provided in an exhaust passage and a motor capable of transmitting power to the internal combustion engine. The controller for the hybrid vehicle includes a catalyst temperature increase control unit configured to execute a catalyst temperature increase control of increasing a temperature of the three-way catalyst device. The catalyst temperature increase control unit is configured to execute a motoring control of rotating a crankshaft of the internal combustion engine with the power of the motor in a state in which combustion of the internal combustion engine is stopped and a fuel introduction process of introducing unburned air-fuel mixture into the exhaust passage by performing fuel injection in the internal combustion engine during the execution of the motoring control.

Fuel gas generated through combustion of air-fuel mixture in the cylinders flows through the exhaust passage of the internal combustion engine during the combustion operation. When the air-fuel mixture is introduced unburned into the exhaust passage without burning the air-fuel mixture in the cylinders, the air-fuel mixture burns in the three-way catalyst device, thereby increasing the temperature of the three-way catalyst device (catalyst temperature). During the execution of the fuel introduction process as described above, the air-fuel mixture in the cylinders needs to be delivered to the exhaust passage by rotating the crankshaft of the internal combustion engine with external power. In the catalyst temperature increase control, the catalyst temperature increase control unit of the controller for the hybrid vehicle as described above executes the motoring control of rotating the crankshaft of the internal combustion engine with the power of the motor in a state in which the combustion of the internal combustion engine is stopped and executes the fuel introduction process during the execution of the motoring control. In such a case, when the motoring control is executable, the fuel introduction process can be executed. Thus, the opportunity to execute the catalyst temperature increase control can be easily obtained.

The hybrid vehicle may include an electric generator that generates electric power when receiving power of the internal combustion engine and include a battery capable of storing electric power generated by the electric generator and supplying the motor with the stored electric power. In this case, the catalyst temperature increase control unit of the controller for the hybrid vehicle may be configured to execute a charge control of performing a combustion operation of the internal combustion engine before the motoring control starts, thereby causing the electric generator to generate electric power. When the motoring control is executed, the power consumption of the motor decreases the battery state of charge. Thus, it is desired that before the motoring control is started, the charge control be executed to increase the battery state of charge.

Further, the catalyst temperature increase control unit may be configured to execute the charge control before the motoring control starts on the condition that a state of charge of the battery when the catalyst temperature increase control starts is less than a given determination value and to start the motoring control without executing the charge control in a case in which the state of charge of the battery when the catalyst temperature increase control starts is greater than or equal to the determination value. When the charge control is performed, the combustion of the internal combustion engine consumes fuel. In addition, a temperature increase in the three-way catalyst device starts at a later timing corresponding to the execution time of the charge control. Thus, it is desired that in a case in which the battery when the catalyst temperature increase control starts is charged with electric power having an amount that prevents the shortage of electric power even after execution of the motoring control, the charge control be not executed.

Further, the catalyst temperature increase control unit may be configured to execute the charge control before the motoring control starts on the condition that warm-up of the internal combustion engine is incomplete and to start the motoring control without executing the charge control in a case in which the warm-up of the internal combustion engine is complete. When the warm-up is incomplete, the friction in the internal combustion engine is large, thereby increasing the power consumption of the motor in the motoring control. Thus, the charge control before the motoring control starts as described above may be executed only when the warm-up of the internal combustion engine is incomplete.

The internal combustion engine includes a filter that captures particulates. The filter is located downstream of the three-way catalyst device in the exhaust passage. In such an internal combustion engine, the particulates deposited in the filter can be burned and removed by increasing the catalyst temperature through the catalyst temperature increase control. That is, as the catalyst temperature increases, the temperature of gas flowing out of the three-way catalyst device and into the filter increases. The heat of the high-temperature gas increases the temperature of the filter. When the temperature of the filter increases to the ignition point of the particulates, the particulates deposited in the filter are burned and removed. In some cases, in the hybrid vehicle including the internal combustion engine with such a filter, the catalyst temperature increase control is performed in order to burn and remove the particulates deposited in the filter. In such a case, when the catalyst temperature increase control unit is configured to estimate the particulate deposition amount of the filter and execute the catalyst temperature increase control on the condition that the estimated particulate deposition amount is greater than or equal to a given value. In such a configuration, the catalyst temperature increase control can be executed at a suitable timing in accordance with how the particulates are deposited in the filter.

A second aspect provides a method for controlling a hybrid vehicle. The hybrid vehicle includes a spark-ignition internal combustion engine having a three-way catalyst device provided in an exhaust passage and includes a motor capable of transmitting power to the internal combustion engine. The method includes executing a catalyst temperature increase control of increasing a temperature of the three-way catalyst device. Executing the catalyst temperature increase control includes executing a motoring control of rotating a crankshaft of the internal combustion engine with the power of the motor in a state in which combustion of the internal combustion engine is stopped and includes executing a fuel introduction process of introducing unburned air-fuel mixture into the exhaust passage by performing fuel injection in the internal combustion engine during the execution of the motoring control.

A third aspect provides a controller configured to control a hybrid vehicle. The hybrid vehicle includes a spark-ignition internal combustion engine having a three-way catalyst device provided in an exhaust passage and includes a motor capable of transmitting power to the internal combustion engine. The controller includes processing circuitry configured to execute a catalyst temperature increase control of increasing a temperature of the three-way catalyst device. The processing circuitry is configured to execute a motoring control of rotating a crankshaft of the internal combustion engine with the power of the motor in a state in which combustion of the internal combustion engine is stopped and execute a fuel introduction process of introducing unburned air-fuel mixture into the exhaust passage by performing fuel injection in the internal combustion engine during the execution of the motoring control.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller for a hybrid vehicle according to a first embodiment will now be described with reference to FIGS. 1 to 3.

Figure 1:
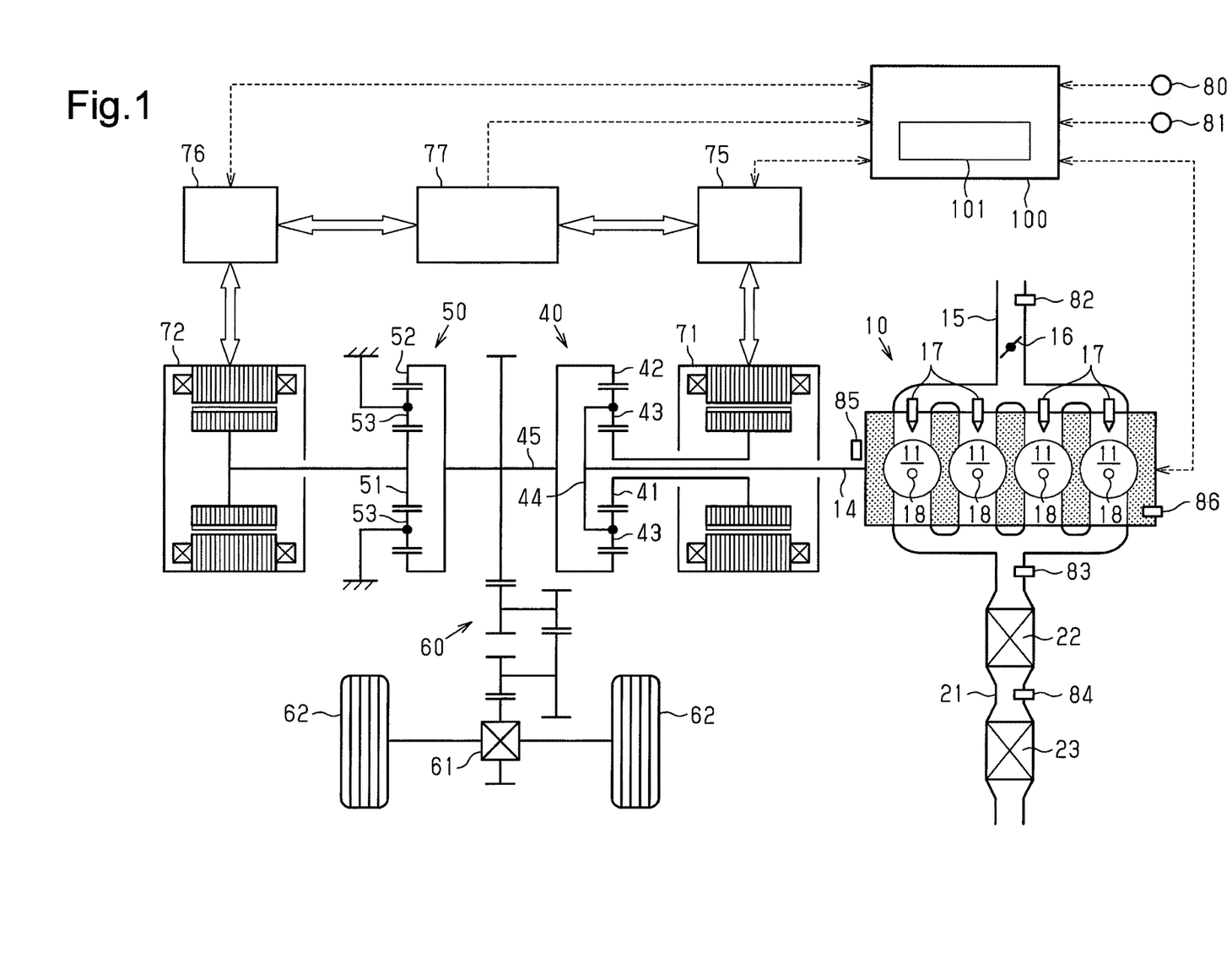
FIG. 1 is a schematic diagram showing the configuration of a controller according to a first embodiment and a second embodiment and the configuration of a hybrid vehicle to which the controller is applied.

As shown in FIG. 1, the hybrid vehicle to which the controller of the present embodiment is applied includes a spark-ignition internal combustion engine 10. Also, the hybrid vehicle includes two motor generators serving as a motor and an electric generator, namely, a first motor generator 71 and a second motor generator 72. Further, the hybrid vehicle includes a battery 77, a first inverter 75, and a second inverter 76. The battery 77 stores electric power generated by the first motor generator 71 and the second motor generator 72 when serving as the electric generators. In addition, the battery 77 supplies the stored electric power to the first motor generator 71 and the second motor generator 72 when serving as the motors. The first inverter 75 adjusts the amount of electric power supplied and received between the first motor generator 71 and the battery 77. The second inverter 76 adjusts the amount of electric power supplied and received between the second motor generator 72 and the battery 77.

The internal combustion engine 10 has multiple cylinders 11, each of which burns air-fuel mixture. The internal combustion engine 10 includes an intake passage 15, through which air is introduced into the cylinder 11. The intake passage 15 includes a throttle valve 16, which adjusts an intake air amount. The section of the intake passage 15 located at the downstream side of the throttle valve 16 branches into the cylinders 11. A fuel injection valve 17 is provided at a portion of the intake passage 15 that branches into each cylinder 11. Each cylinder 11 includes an ignition device 18, which ignites, by spark discharge (spark), air-fuel mixture introduced into the cylinders 11. Further, the internal combustion engine 10 is provided with an exhaust passage 21, through which exhaust gas generated through combustion of air-fuel mixture in each cylinder 11 is discharged. A three-way catalyst device 22, which removes exhaust gas, is provided in the exhaust passage 21. Additionally, a filter 23 that captures particulates is provided in the exhaust passage 21 at the downstream side of the three-way catalyst device 22.

Air-fuel mixture containing fuel injected by the fuel injection valves 17 is introduced through the intake passage 15 into the cylinders 11 of the internal combustion engine 10. When the ignition device 18 ignites the air-fuel mixture, combustion takes place in the cylinders 11. The exhaust gas generated through the combustion is discharged from the cylinders 11 to the exhaust passage 21. In the internal combustion engine 10, the three-way catalyst device 22 oxidizes HC and CO in the exhaust gas and reduces NOx, and the filter 23 captures particulates in the exhaust gas to remove the exhaust gas.

The hybrid vehicle includes a first planetary gear mechanism 40. The first planetary gear mechanism 40 has a sun gear 41, which is an external gear, and a ring gear 42, which is an internal gear coaxially arranged with the sun gear 41. Pinion gears 43, which mesh with the sun gear 41 and the ring gear 42, are provided between the sun gear 41 and the ring gear 42. The pinion gears 43 are supported by a carrier 44 to be allowed to orbit and rotate. The crankshaft 14, which is an output shaft of the internal combustion engine 10, is coupled to the carrier 44 of the first planetary gear mechanism 40. The first motor generator 71 is coupled to the sun gear 41. A ring gear shaft 45 is connected to the ring gear 42. Driven wheels 62 are coupled to the ring gear shaft 45 via a deceleration mechanism 60 and a differential mechanism 61. In addition, the second motor generator 72 is coupled to the ring gear shaft 45 via a second planetary gear mechanism 50.

The second planetary gear mechanism 50 has a sun gear 51, which is an external gear, and a ring gear 52, which is an internal gear coaxially arranged with the sun gear 51. Pinion gears 53, which mesh with the sun gear 51 and the ring gear 52, are provided between the sun gear 51 and the ring gear 52. The pinion gears 53 are rotational but are not allowed to orbit. The ring gear shaft 45 is connected to the ring gear 52 of the second planetary gear mechanism 50. The second motor generator 72 is connected to the sun gear 51.

The hybrid vehicle includes an electronic control unit 100, which serves as the controller for the hybrid vehicle. The electronic control unit 100 includes processing circuitry. The electronic control unit 100 receives detection signals of the depression amount of the acceleration pedal by the driver (accelerator pedal depression degree), which are sent by an acceleration pedal sensor 80, and detection signals of the travelling speed of the vehicle (vehicle speed), which are sent by a vehicle speed sensor 81. Additionally, the electronic control unit 100 obtains a battery state of charge, which is the amount of electric power stored in the battery 77.

Further, the electronic control unit 100 receives detection signals of various types of sensors installed in the internal combustion engine 10, such as an airflow meter 82, an air-fuel ratio sensor 83, a catalyst outflow gas temperature sensor 84, a crank angle sensor 85, and a water temperature sensor 86. The airflow meter 82 is located upstream of the throttle valve 16 in the intake passage 15 to detect the flow rate of air flowing through the intake passage 15 (intake air amount). The air-fuel ratio sensor 83 is located upstream of the three-way catalyst device 22 in the exhaust passage 21 to detect the oxygen concentration of gas flowing through the exhaust passage 21, that is, the air-fuel ratio of the air-fuel mixture. The catalyst outflow gas temperature sensor 84 is located between the three-way catalyst device 22 and the filter 23 in the exhaust passage 21 to detect the temperature of gas flowing out of the three-way catalyst device 22 (catalyst outflow gas temperature). The crank angle sensor 85 is located in the vicinity of the crankshaft 14 to detect the rotation phase of the crankshaft 14. The water temperature sensor 86 is located in a coolant passage (not shown) to detect the temperature of coolant flowing through the coolant passage (coolant temperature). The electronic control unit 100 obtains the rotation speed of the crankshaft 14 of the internal combustion engine 10 (engine rotation speed) from detection signals of the crank angle sensor 85.

The control of the hybrid vehicle performed by the electronic control unit 100 will now be described. The electronic control unit 100 calculates a required torque, which is a required value of torque to be output to the ring gear shaft 45, based on the acceleration pedal depression degree and the vehicle speed. In accordance with parameters such as the required torque and battery state of charge, the electronic control unit 100 determines the torque distributions of the internal combustion engine 10, the first motor generator 71, and the second motor generator 72 and controls the output torque of the internal combustion engine 10 and the driving/regenerative torque of the first motor generator 71 and the second motor generator 72.

The electronic control unit 100 is configured to stop the combustion operation of the internal combustion engine 10 on the condition that the battery state of charge exceeds a given charge required value while the hybrid vehicle is not travelling or while the hybrid vehicle is travelling at a low speed. While the hybrid vehicle is not travelling or while the hybrid vehicle is travelling at a low speed, in a case in which the battery state of charge is less than or equal to the charge required value, the combustion operation of the internal combustion engine 10 is performed so that the power of the internal combustion engine 10 causes the first motor generator 71 to generate power.

As described above, in the internal combustion engine 10, the filter 23 in the exhaust passage 21 captures particulates in exhaust gas. When the captured particulates deposit in the filter 23, the filter 23 may be clogged eventually. To burn and remove the particulates deposited in the filter 23, the temperature of the filter 23 needs to be increased to become greater than or equal to the ignition point of particulates. When the temperature of the three-way catalyst device 22 (catalyst temperature), which is located upstream of the filter 23 in the exhaust passage 21, increases, the temperature of gas flowing out of the three-way catalyst device 22 and into the filter 23 increases. Due to the heat received from the high-temperature gas flowing in, the temperature of the filter 23 also increases. Thus, the particulates deposited in the filter 23 can be burned and removed by increasing the temperature of the three-way catalyst device 22. In the present embodiment, when the deposition amount of particulates of the filter 23 becomes large, the control of increasing the catalyst temperature to burn and remove the deposited particulates, that is, the catalyst temperature increase control, is executed. The catalyst temperature increase control is executed by a catalyst temperature increase control unit 101, which is arranged in the electronic control unit 100.

During the combustion operation of the internal combustion engine 10, the catalyst temperature increase control unit 101 determines whether a temperature increase request has been issued. The catalyst temperature increase control is executed when it is determined in this determination that the temperature increase request has been issued.

Figure 2:
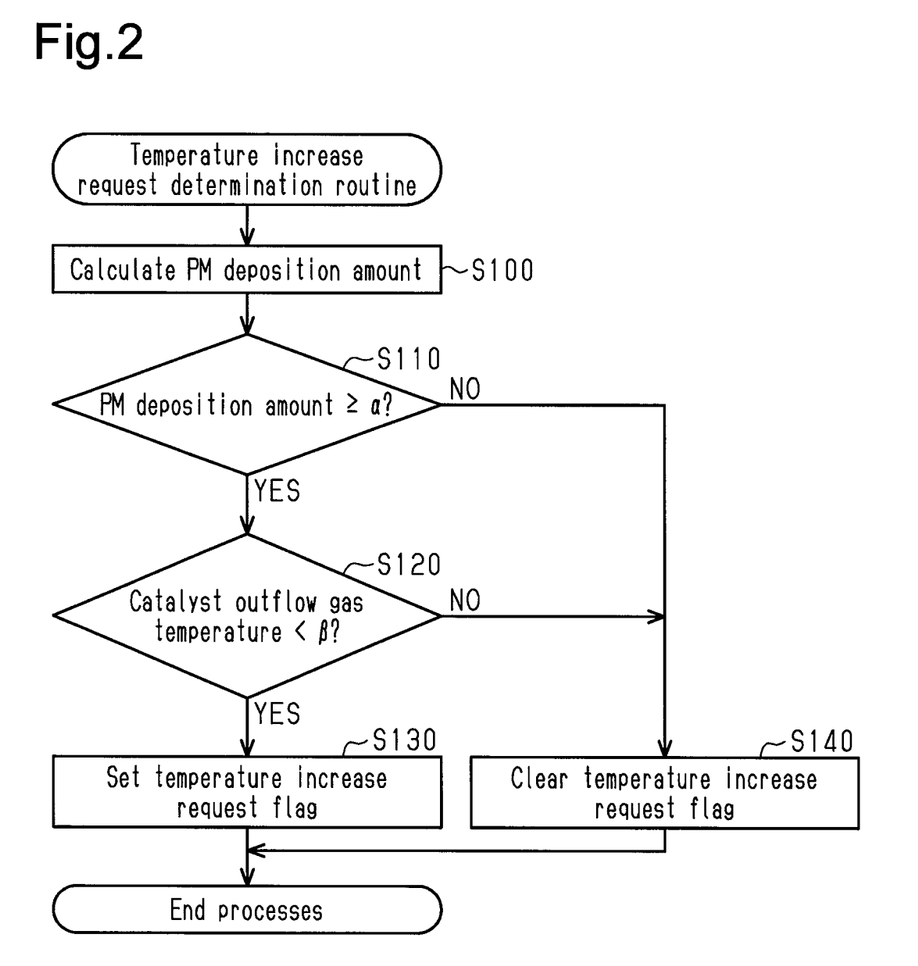
FIG. 2 is a flowchart illustrating the procedure for a temperature increase request determination routine executed by the catalyst temperature increase control unit in the controller for the hybrid vehicle according to the first embodiment.

FIG. 2 illustrates the procedure for a temperature increase request determination routine of determining whether such a temperature increase request has been issued. The processes of this routine are repeatedly executed by the catalyst temperature increase control unit 101 at given control intervals during the combustion operation of the internal combustion engine 10.

When the processes of this routine are started, in step S100, the catalyst temperature increase control unit 101 first calculates a PM deposition amount, which refers to the estimated value of the deposition amount of particulates in the filter 23. In the calculation of the PM deposition amount, the amount of particulates generated through the combustion of air-fuel mixture in the cylinders 11 (PM generation amount) is calculated from the operating state of the internal combustion engine 10 (parameters such as intake air amount and fuel injection amount). Further, the amount of particulates to be burned in the filter 23 (PM reproduction amount) is calculated with the manner described later. The PM deposition amount is calculated by updating the value of the PM deposition amount to the value obtained by adding, to a value prior to being updated, the difference obtained by subtracting the PM reproduction amount from the PM generation amount.

The PM reproduction amount is calculated in the following manner. As the catalyst outflow gas temperature, which is the temperature of gas flowing into the filter 23, becomes higher, the temperature of the filter 23 (filter temperature) becomes higher. Thus, the filter temperature can be obtained from the catalyst outflow gas temperature. When gas containing oxygen flows into the filter 23 in a state in which the temperature of the filter 23 is greater than or equal to the ignition point of particulates, the particulates deposited in the filter 23 burn. Oxygen is needed to burn particulates. Thus, the amount of the particulates to be burned in the filter 23 is defined by the amount of oxygen (oxygen inflow amount) in the gas flowing into the filter 23 (oxygen inflow amount). The oxygen concentration of gas flowing into the filter 23 can be obtained from the detection result of the air-fuel ratio sensor 83. The flow rate of gas flowing into the filter 23 can be obtained from the intake air amount and the fuel injection amount. In the present embodiment, the PM reproduction amount is calculated based on the catalyst outflow gas temperature, the air-fuel ratio of exhaust gas, the intake air amount, and the fuel injection amount.

Subsequently, the catalyst temperature increase control unit 101 determines whether the PM deposition amount is greater than or equal to a given value $\alpha$. When the PM deposition amount is less than the given value $\alpha$ (NO), the process is advanced to step S140. After a temperature increase request flag is cleared in step S140, the processes of the current routine are ended. The temperature increase request flag indicates that the temperature increase request has been issued in a state in which the flag is set and indicates that the temperature increase request has not been issued in a state in which the flag is cleared.

When the PM deposition amount is greater than or equal to the given value $\alpha$ (S110: YES), the process is advanced to step S120. In step S120, the catalyst temperature increase control unit 101 determines whether the catalyst outflow gas temperature is less than a given reproducible temperature $\beta$. The reproducible temperature $\beta$ is set as a lower limit value of the catalyst outflow gas temperature necessary to set the filter temperature to become greater than or equal to the ignition point of particulates.

When the catalyst outflow gas temperature is greater than or equal to the reproducible temperature $\beta$ (S120: NO), the temperature increase request flag is cleared in step S140. Then, the processes of the current routine are ended. When the catalyst outflow gas temperature is less than the reproducible temperature $\beta$ (S120: YES), the temperature increase request flag is set in step S130. Then, the processes of the current routine are ended.

As described above, the catalyst temperature increase control unit 101 estimates the particulate deposition amount of the filter 23 and determines that the temperature increase request has been issued when the estimated particulate deposition amount (PM deposition amount) is greater than or equal to the given value $\alpha$. However, even if the PM deposition amount is greater than or equal to the given value $\alpha$, when the catalyst outflow gas temperature is greater than or equal to the reproducible temperature $\beta$ and the catalyst temperature is increased to become greater than or equal to a temperature that allows for combustion of particulates deposited in the filter 23, it is determined that the temperature increase request has not been issued.

Figure 3:
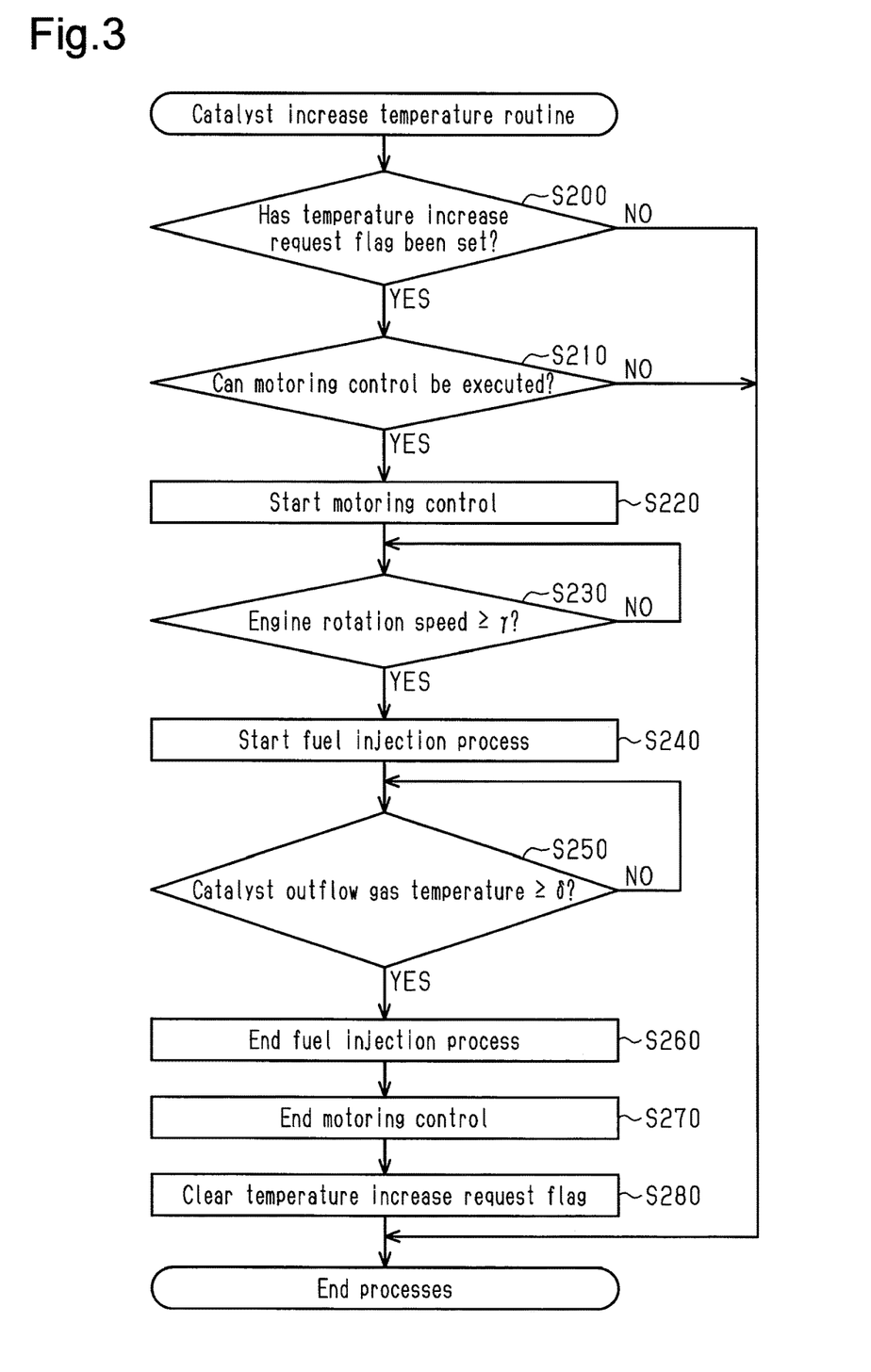
FIG. 3 is a flowchart illustrating the procedure for a catalyst temperature increase control routine executed by the catalyst temperature increase control unit.

FIG. 3 illustrates the procedure for a catalyst temperature increase control routine for the catalyst temperature increase control. The catalyst temperature increase control unit 101 starts the processes of this routine when the combustion operation of the internal combustion engine 10 is stopped and rotation of the crankshaft 14 is stopped.

When the processes of the current routine are started, the catalyst temperature increase control unit 101 first determines in step S200 whether the temperature increase request flag is set. When the temperature increase request flag is set (YES), the process is advanced to step S210. When the temperature increase request flag is cleared (NO), the processes of the current routine are ended.

When the process is advanced to step S210, the catalyst temperature increase control unit 101 determines in step S210 whether a motoring control can be executed. Motoring refers to an action in which the crankshaft 14 of the internal combustion engine 10 with the combustion stopped is rotated with the power of the first motor generator 71. More specifically, it is determined in step S210 based on parameters such as battery state of charge whether the battery 77 can supply the electric power necessary for motoring in a period until completion of the catalyst temperature increase control. When the motoring control can be executed (YES), the process is advanced to step S220. When the motoring control cannot be executed (NO), the processes of the current routine are ended.

When the process is advanced to step S220, the catalyst temperature increase control unit 101 starts the motoring control in step S220. When the motoring control is started to rotate the crankshaft 14, air is drawn into and discharged out of the cylinders 11 of the internal combustion engine 10. In the internal combustion engine 10, the fuel injection of the fuel injection valve 17 and the spark of the ignition device 18 are stopped. Thus, the air introduced into each cylinder 11 is discharged to the exhaust passage 21.

In the motoring control, the rotation speed of the first motor generator 71 is controlled such that the engine rotation speed becomes greater than or equal to a given temperature increasing rotation speed $\gamma$. The temperature increasing rotation speed $\gamma$ is set as a value of an engine rotation speed serving as an amount in which the flow rate of air discharged to the exhaust passage 21 is necessary for increasing the temperature of the catalyst.

After the motoring is started, when the engine rotation speed becomes greater than or equal to the temperature increasing rotation speed $\gamma$ (S230: YES), the catalyst temperature increase control unit 101 starts a fuel introduction process in step S240. In the fuel introduction process, the fuel injection of the fuel injection valve 17 is executed with the spark of the ignition device 18 stopped. Air-fuel mixture containing fuel injected by the fuel injection valve 17 is introduced unburned into the exhaust passage 21. The unburned air-fuel mixture flows into the three-way catalyst device 22 and burns in the three-way catalyst device 22, thereby increasing the catalyst temperature.

The fuel introduction process is continued until the catalyst outflow gas temperature becomes greater than or equal to a given temperature increase complete temperature $\delta$. The temperature increase complete temperature $\delta$ is set as a value of a temperature higher than the above-described reproducible temperature $\beta$.

When the catalyst outflow gas temperature becomes greater than or equal to the temperature increase complete temperature $\delta$ (S250: YES), the fuel introduction process is ended in step S260. Further, the motoring control is also ended in step S270. Subsequently, the temperature increase request flag is cleared in step S280. Then, the processes of the current routine are ended.

During the execution of the fuel introduction process for the catalyst temperature increase control as described above, the crankshaft 14 needs to be rotated by external power in order to deliver the air-fuel mixture in the cylinders 11 to the exhaust passage 21. In conventional hybrid vehicles, the conditions for executing such a fuel introduction process are satisfied only while the vehicles are coasting, which allows the crankshaft 14 to be rotated through the transmission of power from the driven wheels 62, even in a state in which the combustion of the internal combustion engine 10 is stopped. In the present embodiment, the conditions for executing the fuel introduction process are satisfied by executing the motoring control to rotate the crankshaft 14 with the power of the first motor generator 71 when the combustion of the internal combustion engine 10 is stopped. Thus, the opportunity to execute the catalyst temperature increase control can be easily obtained.

Second Embodiment

A controller for a hybrid vehicle according to a second embodiment will now be described in detail with reference to FIG. 4. In the present embodiment, the same reference numerals are given to those components that the same as the corresponding components of the above-described embodiment and detailed description thereof is omitted.

In the motoring control, the first motor generator 71 consumes electric power. In particular, when warm-up of the internal combustion engine 10 is incomplete, the friction in the internal combustion engine 10 is large. As a result, since the torque necessary to rotate the crankshaft 14 becomes large, the first motor generator 71 consumes an increased amount of electric power in the motoring control. Even after completion of the catalyst temperature increase control, the battery state of charge necessary to restart the internal combustion engine 10 needs to be left. Thus, in a case in which the battery state of charge is less than or equal to a certain amount when the catalyst temperature increase control starts, the motoring control cannot be executed, that is, the catalyst temperature increase control cannot be completed. In the present embodiment, before the motoring control starts, a charge control is executed to perform the combustion operation of the internal combustion engine 10 in order to cause the first motor generator 71 to generate electric power.

Figure 4:
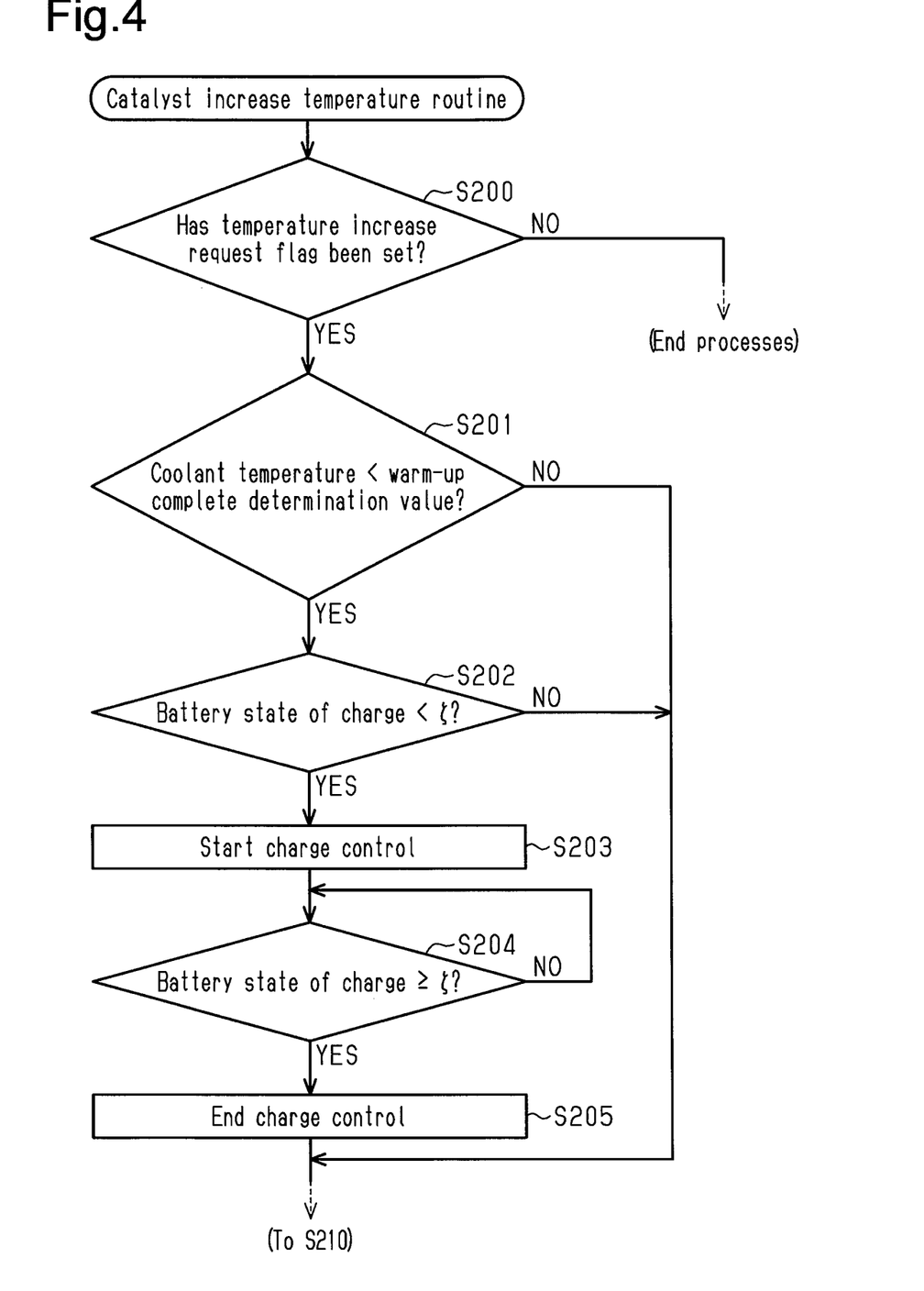
FIG. 4 is a flowchart illustrating part of the procedure for the catalyst temperature increase control routine executed by the catalyst temperature increase control unit in the controller for the hybrid vehicle according to the second embodiment.

FIG. 4 illustrates part of the procedure for a catalyst temperature increase control routine in the present embodiment. In the catalyst temperature increase control routine of the first embodiment in FIG. 3, the affirmative determination (YES) is made in step S200 and then the process is advanced to step S210. In the second embodiment, as shown in FIG. 4, the affirmative determination is made in step S200 and then the process is advanced through steps S201 to S205 to step S210. The second embodiment is the same as the first embodiment in that the process is ended after the negative determination (NO) is made in step S200. Further, the second embodiment is the same as the first embodiment in the subsequent processes executed after the process is advanced to step S210.

In the current routine, when the temperature increase request flag is set (S200: YES), the process is advanced to step S201. In step S201, the catalyst temperature increase control unit 101 determines whether the coolant temperature of the internal combustion engine 10 is less than a given warm-up complete determination value. The warm-up complete determination value is set as a lower limit value of the coolant temperature when the warm-up of the internal combustion engine 10 is complete. When the coolant temperature is less than the warm-up complete determination value (YES), that is, when the warm-up of the internal combustion engine 10 is incomplete, the process is advanced to step S202. When the coolant temperature is greater than or equal to the warm-up complete determination value (NO), that is, when the warm-up of the internal combustion engine 10 is complete, the process is advanced to step S210.

When the process is advanced to step S202, the catalyst temperature increase control unit 101 determines in step S202 whether the battery state of charge is less than a given determination value ζ. The determination value ζ is set as a value of the battery state of charge before the motoring control starts, which serves as an amount in which the battery state of charge after completion of the control exceeds the above-described charge required value when the motoring control is executed in a state in which the warm-up of the internal combustion engine 10 is incomplete. When the battery state of charge is greater than or equal to the determination value ζ (NO), the process is advanced to step S210. When the battery state of charge is less than the determination value ζ (YES), the process is advanced to step S203.

When the process is advanced to step S203, in step S203, the catalyst temperature increase control unit 101 starts the charge control such that the combustion operation of the internal combustion engine 10 causes the first motor generator 71 to generate electric power. The charge control is continued until the battery state of charge becomes greater than or equal to the determination value ζ. When the battery state of charge becomes greater than or equal to the determination value ζ (S204: YES), the charge control is ended in step S205. Then, the process is advanced to step S210.

In the controller for the hybrid vehicle of the present embodiment, the battery state of charge can be increased before the motoring control starts by executing the charge control to perform the combustion operation of the internal combustion engine 10 in order to cause the first motor generator 71 to generate electric power. In the present embodiment, such a charge control is performed when the friction in the internal combustion engine 10 is large in a state in which the warm-up is incomplete, the power consumption for the motoring control is large, and the battery state of charge before the catalyst temperature increase control starts is less than a cold motoring control permitted determination value. That is, in a case in which the battery state of charge after completion of the catalyst temperature increase control is less likely to be insufficient even without the charge control, the motoring control is started without executing the charge control. In this case, the time to complete the catalyst temperature increase control is shorter than in a case in which the charge control is performed. Further, in this case, like when the charge control is performed, fuel is not consumed for the combustion operation of the internal combustion engine 10.

The above-described embodiments may be modified as follows. The present embodiments and the following modifications can be combined as long as the combined modifications remain technically consistent with each other.

In the second embodiment, the charge control is executed when the warm-up of the internal combustion engine 10 is incomplete and the battery state of charge when the catalyst temperature increase control starts is less than the determination value ζ. When the warm-up of the internal combustion engine 10 is incomplete, the charge control before the motoring control starts may be executed regardless of the battery state of charge when the catalyst temperature increase control starts. Further, in a case in which the battery state of charge when the catalyst temperature increase control starts is less than the determination value, the charge control before the motoring control starts may be executed regardless of the warm-up status of the internal combustion engine 10. Additionally, the charge control before the motoring control starts may be executed when one of the condition that the warm-up of the internal combustion engine 10 is incomplete and the condition that the battery state of charge when the catalyst temperature increase control starts is less than the determination value is satisfied. Conditions other than these ones may be set as the conditions of executing the charge control before the motoring control starts. Further, when the catalyst temperature increase control is executed, the charge control before the motoring control starts may be constantly executed.

The logic for estimating the PM deposition amount in the above-described embodiments is exemplary. Instead, other estimation logics may be employed.

In the above-described embodiments, the timing of ending the fuel introduction process, that is, the timing of completing the catalyst temperature increase control, is determined based on the catalyst outflow gas temperature. Instead, the determination may be made based on other parameters such as the time elapsed after the fuel introduction process starts. In addition, the fuel introduction process may be continued using parameters such as the depression of the accelerator pedal and an increase in the battery state of charge until the combustion operation of the internal combustion engine 10 is resumed.

In the above-described embodiments, unburned air-fuel mixture is introduced into the exhaust passage 21 by performing fuel injection with the spark of the ignition device 18 stopped. The timing at which the spark of the ignition device 18 can ignite the air-fuel mixture in the cylinders 11 is limited to a period close to the compression top dead center. That is, there is a period in which air-fuel mixture does not burn in the cylinders 11 even if the spark is generated. Thus, the fuel introduction of introducing unburned air-fuel mixture into the exhaust passage 21 can also be executed by performing fuel injection while generating the spark of the ignition device 18 during such a period.

In the above-described embodiments, the catalyst temperature increase control is performed in order to burn and remove particulates deposited in the filter 23. However, the catalyst temperature increase control in the above-described embodiments may be employed for other purposes even when the temperature of the three-way catalyst device 22 is increased for other purposes. For example, a catalyst temperature increase control may be performed for the purpose of restoring the exhaust purification performance of the three-way catalyst device 22 when the exhaust purification performance is reduced due to a decrease in the catalyst temperature.

In the above-described embodiments, the fuel introduction process is executed through the fuel injection into the intake passage 15 by the fuel injection valve 17. Alternatively, it is possible to execute the fuel introduction process through fuel injection into the cylinders 11 in an internal combustion engine equipped with fuel injection valves of an in-cylinder injection type, which inject fuel into the cylinders 11.

The controller for the hybrid vehicle of the above-described embodiments may be applied to a hybrid vehicle having a configuration different from the configuration of the hybrid vehicle in FIG. 1 as long as the controller includes a spark-ignition internal combustion engine provided with a three-way catalyst device in an exhaust passage and includes a motor capable of transmitting power to the internal combustion engine.

The electronic control unit 100 or the catalyst temperature increase control unit 101 is not limited to a device that includes a CPU and a memory and executes software processing. For example, at least part of the processes executed by the software in the above-described embodiments may be executed by hardware circuits dedicated to execution of these processes (such as ASIC). That is, the electronic control unit 100 or the catalyst temperature increase control unit 101 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller configured to control a hybrid vehicle, wherein
   the hybrid vehicle includes
      a spark-ignition internal combustion engine having a three-way catalyst device provided in an exhaust passage, and
      a motor capable of transmitting power to the internal combustion engine, and
   the controller comprises a catalyst temperature increase control unit configured to execute:
      a catalyst temperature increase control of increasing a temperature of the three-way catalyst device;
      a motoring control of rotating a crankshaft of the internal combustion engine with the power of the motor in a state in which combustion of the internal combustion engine is stopped; and
      a fuel introduction process of introducing unburned air-fuel mixture into the exhaust passage by performing fuel injection in the internal combustion engine during the execution of the motoring control, when the catalyst temperature is lower than a predetermined temperature.

2. The controller according to claim 1, wherein
   the hybrid vehicle includes
      an electric generator that generates electric power when receiving power of the internal combustion engine, and
      a battery capable of storing electric power generated by the electric generator and supplying the motor with the stored electric power, and
   the catalyst temperature increase control unit is configured to execute a charge control of performing a combustion operation of the internal combustion engine before the motoring control starts so that the electric generator generates electric power.

3. The controller according to claim 2, wherein the catalyst temperature increase control unit is configured to:
   execute the charge control before the motoring control starts on the condition that a state of charge of the battery when the catalyst temperature increase control starts is less than a given determination value; and
   start the motoring control without executing the charge control in a case in which the state of charge of the battery when the catalyst temperature increase control starts is greater than or equal to the determination value.

4. The controller according to claim 2, wherein the catalyst temperature increase control unit is configured to:
   execute the charge control before the motoring control starts on the condition that warm-up of the internal combustion engine is incomplete; and
   start the motoring control without executing the charge control in a case in which the warm-up of the internal combustion engine is complete.

5. The controller according to claim 1, wherein
   the internal combustion engine includes a filter that captures particulates, the filter being located downstream of the three-way catalyst device in the exhaust passage, and
   the catalyst temperature increase control unit is configured to estimate a particulate deposition amount of the filter and execute the catalyst temperature increase control on the condition that the estimated particulate deposition amount is greater than or equal to a given value.

6. A method for controlling a hybrid vehicle, wherein
   the hybrid vehicle includes
      a spark-ignition internal combustion engine having a three-way catalyst device provided in an exhaust passage, and
      a motor capable of transmitting power to the internal combustion engine,
   the method comprises executing a catalyst temperature increase control of increasing a temperature of the three-way catalyst device, and
   executing the catalyst temperature increase control includes
      executing a motoring control of rotating a crankshaft of the internal combustion engine with the power of the motor in a state in which combustion of the internal combustion engine is stopped; and
      executing a fuel introduction process of introducing unburned air-fuel mixture into the exhaust passage by performing fuel injection in the internal combustion engine during the execution of the motoring control, when the catalyst temperature is lower than a predetermined temperature.

7. A controller configured to control a hybrid vehicle, wherein
   the hybrid vehicle includes
      a spark-ignition internal combustion engine having a three-way catalyst device provided in an exhaust passage, and
      a motor capable of transmitting power to the internal combustion engine, and
   the controller comprises processing circuitry configured to execute:

a catalyst temperature increase control of increasing a temperature of the three-way catalyst device;

a motoring control of rotating a crankshaft of the internal combustion engine with the power of the motor in a state in which combustion of the internal combustion engine is stopped; and a fuel introduction process of introducing unburned air-fuel mixture into the exhaust passage by performing fuel injection in the internal combustion engine during the execution of the motoring control, when the catalyst temperature is lower than a predetermined temperature.

\* \* \* \* \*